United States Patent Office 3,329,652
Patented July 4, 1967

3,329,652
PROCESS FOR CURING POLYEPOXIDES WITH ANHYDRIDES AND ACTIVATORS THEREFOR
Samuel H. Christie, Warren Township, N.J., assignor to Shell Oil Company, New York, N.Y., a corporation of Delaware
No Drawing. Filed Feb. 15, 1965, Ser. No. 432,807
10 Claims. (Cl. 260—47)

This invention relates to a process for curing polyepoxides. More particularly, the invention relates to a new process for curing polyepoxides with acid anhydrides using a special class of activators for the anhydrides, and to the resulting cured products.

Specifically, the invention provides a new process for curing polyepoxides, and preferably glycidyl polyethers of polyhydric phenols and polyhydric alcohols, which comprises mixing and reacting the polyepoxide with an acid anhydride and an activator for the anhydride comprising a salt of a heterocyclic nitrogen compound which possesses in the ring (1) a substituted C—N=C group and (2) an —NH— group, and preferably a salt of an imidazole compound having the structural formula

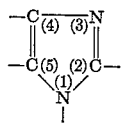

such as, 2-ethyl-4-methylimidazole acetate, benzimidazole acetate, and imidazole lactate. The invention further provides cured products obtained by the above described process.

It is known that acid anhydrides can be used by themselves as curing agents for polyepoxides, such as the glycidyl polyethers of polyhydric phenols. These curing agents, however, have certain undesirable properties which have placed a considerable limitation on their commercial utilization. It has been found, for example, that the acid anhydrides show little activity in the cure of the polyepoxides at room temperature or at slightly elevated temperatures, but are effective curing agents only at very high temperatures. This prevents their use in the preparation of compositions that are to be cured at a lower temperature or compositions that might be injured by the high temperatures. Even at the high reaction temperatures, the anhydrides in many cases react very slowly and they are generally undesirable for use when the cure must take place rapidly.

It has been proposed to add certain materials to accelerate the cure with the acid anhydrides, but this has not met all the problems involved in this type of cure. For example, many of the accelerators speed the cure at high temperatures, but do not permit the use of lower cure temperatures. In other cases, the presence of the accelerator has a detrimental effect on the properties of the resulting product. In still other cases the accelerator shortens the pot life of the mixture.

It is an object of the invention, therefore, to provide a new method for curing polyepoxides. It is a further object to provide a new process for curing polyepoxides using acid anhydrides and a new class of accelerator. It is a further object to provide a new process for curing polyepoxides with anhydrides that can be used at a lower cure temperature. It is a further object to provide a process for curing polyepoxides with anhydrides that gives products having improved physical properties. It is a further object to provide new resinified polyepoxides having excellent physical properties. It is a further object to provide anhydride cured epoxy resins having high heat deflection temperatures. These and other objects of the invention will be apparent from the following detailed description thereof.

It has now been discovered that these and other objects are accomplished by the process of the invention comprising mixing and reacting the polyepoxides with an acid anhydride and an activator for the anhydride comprising salts of certain heterocyclic compounds which possess in the ring (1) a substituted C—N=C group and (2) an —NH— group, and preferably a salt of an imidazole compound, such as 2-ethyl-4-methylimidazole acetate, benzimidazole acetate, and imidazole lactate. It has been found that when the anhydrides are used in combination with the above-described activators they display surprising high activity as curing agents for the polyepoxides, especially at the lower temperatures, and also provide improved pot life at room temperatures. The combination of anhydride and activator gives a very rapid rate of cure at the higher temperatures and is particularly suited for use in the preparation of rapid cure high temperature coatings and castings. Excellent rates of cure are also obtained at the lower reaction temperatures that heretofore could not be used with anhydrides alone. Special advantage is also found in the fact that the cured products obtained by the above-noted process have higher heat deflection temperatures than those obtained by the use of the anhydride alone and with anhydrides and tertiary amine activators.

The acid anhydrides used as the curing agent in the process of the invention may be any anhydride which is derived from a carboxylic acid and possesses at least one anhydride group, i.e., a

group. The carboxylic acids used in the formation of the anhydrides may be saturated, unsaturated, aliphatic, cycloaliphatic, aromatic or heterocyclic. They may also possess 1, 2, 3 or more cyclic anhydride groups. Examples of these anhydrides include, among others, phthalic anhydride, isophthalic anhydride, di-, tetra- and hexahydrophthalic anhydride, 3,4,5,6,7,7-hexachloro-3,6-endomethylene 1,2-tetrahydrophthalic anhydride (chlorendic anhydride), succinic anhydride, maleic anhydride, chlorosuccinic anhydride, monochloromaleic anhydride, 6-ethyl-4-cyclohexadiene-1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, adducts of maleic anhydride with polyunsaturates, such as methylcyclopentadiene (Nadic methyl anhydride), 3-methoxy-1,2,3,6-tetrahydrophthalic acid anhydride, 3-butoxy-1,2,3,6-tetrahydrophthalic anhydride, trimellitic anhydride, pyromellitic anhydride, di-, tetra- and hexahydropyromellitic anhydride, polyadipic acid anhydride, polysebacic acid anhydride, and the like and mixtures thereof. Derivatives of the anhydrides, such as their partial esters, amides, etc., may also be employed. Examples of these include, for example, esters of glycols and pyromellitic anhydride and partial esters of trimellitic anhydride.

Preferred anhydrides to be employed in the process comprise the aliphatic, cycloaliphatic and aromatic mono- and dianhydrides (i.e., those possessing two of the above-noted anhydride groups such as pyromellitic anhydride), and the chlorinated derivatives of the aforedescribed mono- and di-anhydrides. Especially preferred are the normally liquid or low melting anhydrides, such as hexahydrophthalic anhydride.

The activators for the anhydrides according to the present invention comprise salts of the heterocyclic compounds possessing in the heterocyclic ring (1) a substituted C=N—C group and (2) a secondary amino group, i.e., an =N—H group. Preferred examples of these heterocyclic compounds include, among others, the imidazoles, such as substituted imidazoles and benzimidazoles having the structural formulas

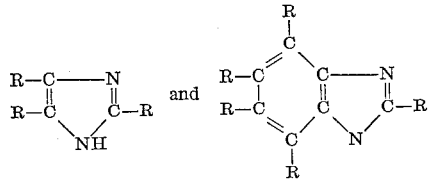

respectively, wherein R is selected from hydrogen atoms, halogen atoms, or an organic radical, such as a hydrocarbon radical or a substituted hydrocarbon radical, for example, the ester, ether, amide, imide, amino, halogen, or mercapto substituted hydrocarbon radicals. The acid portion of the salt is selected from an acid, such as phosphoric, acetic, lactic, formic, propionic, and the like. Especially preferred imidazoles are those wherein the substituent is hydrogen or a hydrocarbon radical, and preferably an alkyl, alkenyl, cycloalkyl, cycloalkenyl, aryl, alkaryl or arylalkyl radicals, and particularly those containing no more than 15 carbon atoms and wherein the acid is selected from monocarboxylic acids having from 1 to 8 carbon atoms, lactic, and phosphoric acids.

A more detailed description of the chemistry of the imidazoles and benzimidazoles including their properties and structural formulas is found in the book by Klaus Hofmann entitled "Imidazole and Its Derivatives" published by Interscience Publishers, Inc., New York (1953). Examples of imidazole salts include, among others, the acetate, formate, lactate, and phosphate salts of imidazole, benzimidazole, and substituted imidazoles. Examples of suitable substituted imidazoles include: 2-methylimidazole; 2-ethyl-4-methylimidazole; 2-cyclohexyl-4-methylimidazole; 4-butyl-5-ethylimidazole; 2-butoxy-4-allylimidazole; 2-carboethoxybutyl-4-methylimidazole; 2-octyl-4-hexylimidazole; 2 - methyl-5-ethylimidazole; 2-ethyl-4-phenylimidazole; 2-amide-5-ethylimidazole; 2-ethyl-4-(2-ethylamino) - imidazole; 2-methyl-4-mercaptoethylimidazole; 2,5-chloro-4-ethylimidazole; and mixtures thereof. Especially preferred are the alkyl-substituted imidazole acetates and lactates wherein the alkyl groups contain not more than 8 carbon atoms each, or mixtures thereof, and particularly preferred are 2-ethyl-4-methylimidazole acetate, 2-ethyl-4-methylimidazole lactate, 2-methylimidazole acetate, 2-methylimidazole lactate, imidazole acetate, imidazole lactate, and mixtures thereof.

The above-described imidazole salts can be prepared by reacting the imidazole with the acid to form the corresponding amine salt. The imidazoles are prepared by conventional techniques of reacting a dialdehyde with ammonia and formaldehyde. The salts are preferably prepared by mixing the desired acid with the imidazole and maintaining the temperature between 23° and 100° C. As heat is evolved in the reaction, cooling means may be needed to keep the temperature in the desired range. Solvents are not necessary but may be employed if desired. One should use at least one gram molecular weight of acid to each gram molecular weight of the imidazole. If longer pot life of the resin-anhydride-acceleration mixture is desired, one should use a larger ratio, i.e., up to a 2:1 ratio of acid to imidazole. The higher the acid level, the more stable the resin-catalyst mixture.

According to the process of the invention, the polyepoxide is cured by admixing the above-described anhydrides and activators with the polyepoxide. The amount of the anhydride to be used in the process will vary over a wide range. Good cures are obtained by reacting the polyepoxide with at least 0.5 equivalent of the anhydride. As used herein in relation to the amount of anhydride and polyepoxide, the expression "equivalent" amount refers to that amount of anhydride needed to furnish one anhydride group for every epoxy group in the polyepoxide to be involved in the cure. To obtain the best results, the anhydride should be employed in about a chemically equivalent amount, and more preferably in equivalent ratio of 1:1 to 1.2:1 of epoxy to anhydride.

The activators, i.e., the imidazole salts described above, are needed only in very small amounts. Excellent results are obtained when the activator is utilized in amounts varying from 0.01% to 10% by weight of the resin, i.e., resin containing both polyepoxide and anhydride, and more preferably in amounts varying from 0.1% to 2% by weight of the resin.

The anhydride and activator may be combined together before they are added to the polyepoxide or they may be added separately.

In executing the process of the invention, it is desirable to have the polyepoxide in a mobile liquid condition when the anhydrides and activator are added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the anhydride and activator by evaporation before or during the curing, such as ketones like acetone, methyl ethyl ketone, methyl isobutyl ketone, isophorone, etc., esters such as ethyl acetate, butyl acetate, Cellosolve acetate (acetate of ethylene glycol monoethyl ether), methyl Cellosolve acetate (acetate of ethylene glycol monomethyl ether), etc.; chlorinated hydrocarbons such as trichloropropane, chloroform, etc. Solvents which remain in the cured composition may also be used, such as diethyl phthalate, dibutyl phthalate, or liquid monoepoxide compounds, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semi-solid polyepoxides in combination with a liquid polyepoxide, such as a normally liquid glycidyl polyether of a polyhydric alcohol. Various other ingredients may be mixed with the polyepoxide composition including pigments, fillers, dyes, plasticizers, resins, and the like.

The cure may be effected over a wide range of temperatures. As indicated, many of the above-described anhydride-activator combinations are active near room temperature, e.g., at about 15° C. to 20° C., and the cure may be accomplished by merely mixing the anhydride-activator combination with the polyepoxide as indicated above and then letting the mixture stand at room temperature. In most applications, it is desirable to effect a more rapid cure and this may be accomplished by raising the temperature. Excellent rates of cure are obtained at temperatures from 50° C. to 200° C. and these are preferred for many applications where heating is permissible. Temperatures much above 200° C. are generally not desirable but may be employed if necessary.

The curing agent-polyepoxide systems described above may be utilized for a great variety of important applications.

The systems described above are very useful in the preparation of electrical pottings and castings. They are particularly suitable for preparing very large castings as can be cured at low temperatures without liberation of large amounts of heat and this gives a more even cure which results in much stronger and more durable products. In this application, the mixture of polyepoxide, anhydride and activator alone or with suitable diluents is added to the desired mold or casting and then allowed to set at room temperature. Heat may be applied in some cases to hasten cure. As the new compositions can be cured at low temperatures, they may be used for encapsulation of electrical equipment which is heat sensitive.

The compositions of the invention are particularly useful for filament winding applications. In the application the filaments such as, for example, glass fibers are passed into and through the liquid composition of the invention and then wound onto the desired mandrel or form and the formed unit allowed to cure, preferably by application of heat. The great advantage of the new compositions in this application is the fact that the composition can be cured at low temperatures and their use would thus not effect heat sensitive material. For example, the rubber lining of missile cases are heat sensitive and would be effected by use of high temperatures for curing material thereon. The new compositions thus could be used for the filament winding of these cases where the winding is directly on the liner.

The above-described systems are also useful in the preparation of laminates. In this application, the sheets of fibrous material are first impregnated with the mixture of polyepoxide, anhydride and activator. This is conveniently accomplished by dissolving the polyepoxide, the anhydride, and activator in acetone so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin state. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton bats, duck muslin, canvas, synthetic fibers such as nylon, dacron and the like. It is usually preferred to utilize woven glass cloth that has been given prior treatment with well known finishing or sizing agents, therefore, such as chrome methacrylate or vinyl trichlorosilane.

In the above applications, the resulting cured products are characterized by their hardness and durability as well as by their improved heat deflection temperatures.

The polyepoxides to be cured by use of the above process are those possessing more than one

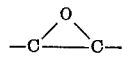

groups. These groups may be terminal, i.e.,

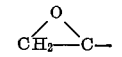

groups or they may be in an internal position. Preferably the epoxy groups are terminal. The polyepoxides may be saturated or unsaturated, aliphatic, cycloaliphatic, aromatic or heterocyclic and may be substituted if desired with substituents such chlorine atoms, hydroxyl groups, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U.S. 2,633,458.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3 - epoxybutyl) 1,2,4-butanetricarboxylate, di(5,6 - epoxypentadecyl) tartarate, di(4,5-epoxytetradecyl) maleate, di(2,3 - epoxybutyl) azelate, di(3,4 - epoxybutyl) citrate, di(5,6-epoxyoctyl) cyclohexane - 1,2-dicarboxylate, di(4,5-epoxyoctadecyl) malonate.

Another group of the epoxy-containing materials includes those epoxidized esters of unsaturated alchols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13 - diepoxyeicosanedioate, dibutyl 7,8,11, 12-diepoxyoctadecanedioate, dioctyl 10,11 - diethyl - 8,9, 12,13-diepoxy-eiconsanedioate, dihexyl 6,7,10,11-diepoxyhexadecanedioate, didecyl 9-epoxy-ethyl - 10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2 - bis(2 - cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali.

Polyether A and Polyether B described in the above-noted U.S. 2,633,458 are good examples of polyepoxides of this type. Other examples include the polyglycidyl ether of 1,1,2,2,-tetrakis(4-hydroxyphenol)ethane (epoxy value of 0.45 eq./100 g. and melting point 85° C.), polyglycidyl ether of 1,1,5,5-tetrakis(hydroxyphenol)pentane (epoxy value of 0.514 eq./100 g.) and the like and mixtures thereof. Other examples include the glycidated novolacs obtained by reacting epichlorohydrin with novolacs resins obtained by condensation of aldehydes with polyhydric phenols.

Of special interest are the polyepoxides containing only elements selected from groups consisting of C, H, N, O, Cl and Br.

To illustrate the manner in which the invention may be carried out, the following examples are given. It is to be understood, however, that the examples are for the purpose of illustration and the invention is not to be regarded as limited to any of the specific materials or conditions recited therein. Unless otherwise specified, parts described in the examples are parts by weight. The polyepoxides referred to herein by letter, such as Polyether A, are those set out in U.S. 2,633,458.

EXAMPLE I

This example illustrates the general preparation of the imidazole salts, and of imidazole lactate in particular.

68 g. (1 mole) of imidazole is placed in a reaction vessel fitted with a stirrer. 105.7 g. of 85% lactic acid (1 mol) is added to vessel over a period of 10 minutes while maintaining continuous stirring. The temperature is maintained between 60°–80° C. for 1 hour to complete the reaction. Upon cooling, the imidazole lactate crystallizes.

Similarly the lactate, acetate, formate, propionate and phosphate salts of imidazole, 2-methylimidazole, 2-ethyl-4-methylimidazole and benzimidazole are prepared by reacting 1 mol of the imidazole with 1–2 mols of acid according to the above procedure.

EXAMPLE II

This example illustrates the superior results obtained by curing a polyepoxide with Nadic anhydride and imidazole lactate which was prepared employing equal mole quantities of imidazole and lactic acid.

100 parts of Polyether A was combined with 90 parts of Nadic methyl anhydride and 1 part of imidazole lactate and the mixture heated for 2 hours at 80° C. plus 4 hours at 150° C. At the end of that time, the resulting product had a heat deflection temperature of 155° C. The viscosity of the product at 25° C. measured; initially, 23.4 poises; after 24 hours, 39.7 poises; and after 72 hours, 106 poises.

For purposes of comparison, the above experiment was repeated except that the imidazole lactate was replaced with the conventional benzyldimethylamine, the heat deflection temperature was only 54° C. and the viscosity measured; initially, 23 poises; after 24 hours, 47 poises; and after 72 hours, 220 poises and contained gel particles.

EXAMPLE III 100 parts of Polyether A was combined with 48 parts of maleic anhydride and 2 parts of 2-ethyl-4-methylimidazole lactate and the mixture heated for 4 hours at 100° C. The resulting product was a hard tough casting having a high heat deflection temperature.

Similar results are obtained when the lactate, acetate, formate and phosphate salts of imidazole, 2-methylimidazole, 2-ethyl-4-methylimidazole and benzimidazole are employed in Example I in place of imidazole lactate with the following anhydrides: maleic anhydride, methyl-3,6-endomethylene-4-tetrahydrophthalic anhydride (Nadic methyl anhydride), hexahydrophthalic anhydride, glutaric anhydride, phthalic anhydride, succinic anhydride, and chlorendic anhydride.

EXAMPLE IV

Examples I to III are repeated with the exception that the Polyether A is replaced with each of the following: Polyether C, Polyether D, diglycidyl ether of resorcinol, diglycidyl phthalate, and epoxidized methylcyclohexenyl cyclohexene carboxylate. Related results are obtained.

EXAMPLE V

A blend of 50 parts of Polyether A and 50 parts of the diglycidyl ester of a hydrogenated dimerized linoleic acid were mixed with 90 parts methyl-3,6-endomethylene-4-tetrahydrophthalic anhydride and 1.0 part 2-ethyl-4-methyl imidazole lactate. The mixture was cured for 3 hours at 80° C. and 4 hours at 130° C. The resulting product exhibited good thermal shock properties. In addition, the weight loss of the cured casting after 1000 hours at 155° C. was less than 1%.

EXAMPLE VI

One hundred parts of Polyether A, 40 parts of coal tar pitch, 70 parts of tetrahydrophthalic anhydride and 1 part 2-ethyl-4-methyl imidazole acetate were mixed and cured 2 hours at 90° C. for 4 hours at 150° C. The resultant product was hard and infusible.

I claim as my invention:

1. A process for curing polyepoxides having a 1,2-epoxy equivalency of at least 1.1 with at least 0.5 equivalent of a polycarboxylic acid anhydride and from 0.1 to 10% by weight of the polyepoxide of an imidazole salt selected from the group consisting of the acetate, formate, lactate, propionate and phosphate salts of 2-ethyl-4-methylimidazole, 2-methylimidazole, imidazole, benzimidazole and mixtures thereof.

2. A process according to claim 1 wherein the polyepoxide is a condensation product of epichlorohydrin and para-para'-isopropylidenediphenol.

3. A process according to claim 1 wherein the polyepoxide is a glycidyl polyether of a polyhedric phenol having a 1,2-epoxy equivalency between 1.1 and 2.0 and a molecular weight between 200 and 1200.

4. A process as in claim 1 wherein the polycarboxylic acid anhydride is an aromatic hydrocarbon polycarboxylic acid anhydride.

5. A process as in claim 1 wherein the polycarboxylic acid anhydride is an aliphatic hydrocarbon polycarboxylic acid ahhydride.

6. A process for curing polyepoxides which comprise mixing and reacting a polyepoxide having more than one vic-epoxy group with at least 0.5 equivalent of Nadic methyl anhydride and from 0.1 to 10% by weight of the polyepoxide of imidazole lactate.

7. A curable composition comprising a glycidyl polyether of a polyhydric phenol, a polycarboxylic anhydride and from 0.1% to 10% by weight of the polyepoxide of an acid salt of an imidazole compound selected from the group consisting of

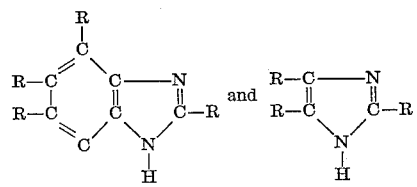

and mixtures thereof where R is a member selected from the group consisting of hydrogen, halogen, and alkyl, alkenyl, cycloalkyl, cycloalkenyl, aryl, alkaryl and arylalkyl radicals containing up to 15 carbon atoms and the acid is selected from the group consisting of acetic, formic, phosphoric, lactic, and propionic acids.

8. A composition according to claim 7 wherein the imidazole salt is imidazole lactate.

9. A process for curing polyepoxides which comprises mixing and reacting a polyepoxide having more than one vic-epoxy group with a polycarboxylic acid anhydride and an activator therefor comprising an acid salt of an imidazole compound selected from the group consisting of

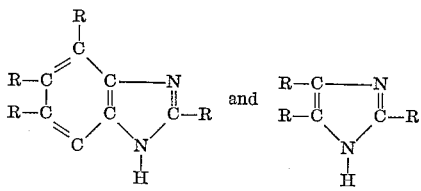

and mixtures thereof wherein R is a member selected from the group consisting of hydrogen, halogen and alkyl, alkenyl, cycloalkyl, cycloalkenyl, aryl, alkaryl and arylalkyl radicals containing up to 15 carbon atoms, and the acid is selected from monocarboxylic acids having 1 to 8 carbon atoms, lactic and phosphoric acids, said curing being accomplished at a temperature range from about 60° C. to about 200° C.

10. A curable composition comprising a polyepoxide having more than one vic-epoxy group, a polycarboxylic acid anhydride and an acid salt of an imidazole compound selected from the group consisting of

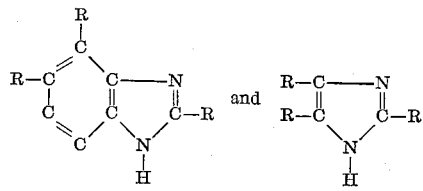

and mixtures thereof wherein R is a member selected from the group consisting of hydrogen, halogen and alkyl, alkenyl, cycloalkyl, cycloalkenyl, aryl, alkaryl and arylalkyl radicals containing up to 15 carbon atoms, and the acid is selected from monocarboxylic acids having 1 to 8 carbon atoms, lactic and phosphoric acids.

References Cited
UNITED STATES PATENTS 3,030,376  4/1962  Liggett et al. _____ 260—2 XR
3,052,650  9/1962  Wear et al. _____ 260—47

SAMUEL H. BLECH, *Primary Examiner.*

WILLIAM H. SHORT, *Examiner.*

T. D. KERWIN, *Assistan Examiner.*